E. E. GOLD.
HEATING SYSTEM.
APPLICATION FILED NOV. 4, 1910.
994,994.
Patented June 13, 1911.
2 SHEETS—SHEET 1.
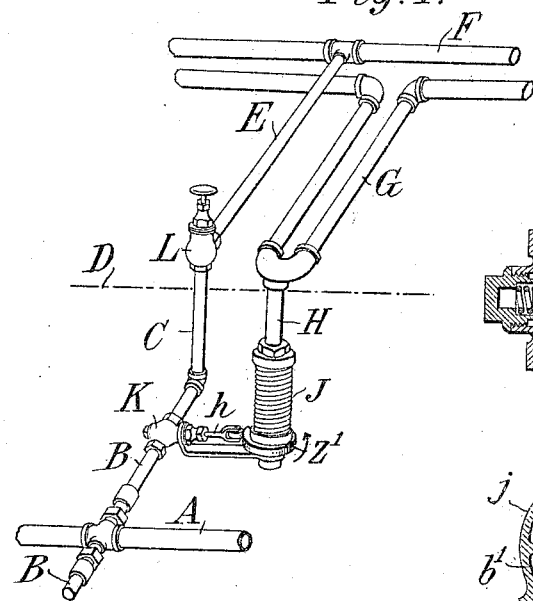
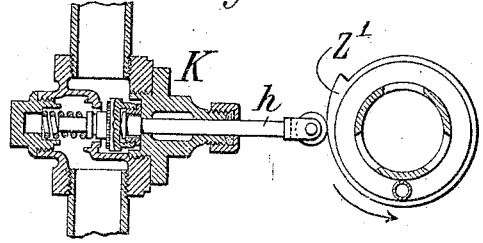
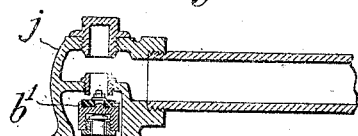
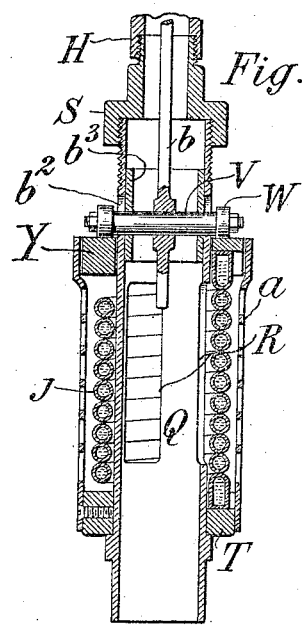
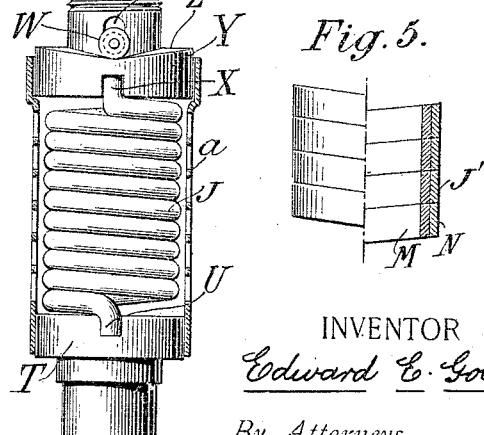
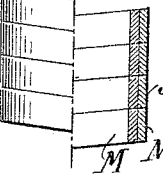
WITNESSES:
Fred White
Rene Buine
INVENTOR
Edward E. Gold,
By Attorneys,

E. E. GOLD.
HEATING SYSTEM.
APPLICATION FILED NOV. 4, 1910.

994,994.

Patented June 13, 1911.

2 SHEETS—SHEET 2.

WITNESSES:
Fred White
René Meine

INVENTOR
Edward E. Gold,
By Attorneys,
Fraser, Trask & Myers
Henry M. Fish

UNITED STATES PATENT OFFICE.

EDWARD E. GOLD, OF NEW YORK, N. Y.

HEATING SYSTEM.

994,994.  Specification of Letters Patent.  Patented June 13, 1911.

Application filed November 4, 1910. Serial No. 590,660.

*To all whom it may concern:*

Be it known that I, EDWARD E. GOLD, a citizen of the United States, residing in the borough of Manhattan, city, county, and State of New York, have invented certain new and useful Improvements in Heating Systems, of which the following is a specification.

In certain prior applications, Serial Numbers 523,997 and 523,998, filed respectively October 22, 1909, I have described heating systems and thermostats therefor, in which a coil of pipe carrying a thermostatic liquid has been used as a vessel, substantially inexpansible, and in which a pressure has been generated for transmission to a separate expansible vessel acting directly upon the valve to be controlled. For some cases it is important to simplify and cheapen the thermostatic mechanism. The present invention accomplishes these and other advantageous results by utilizing the coil as the expansible element of the thermostatic mechanism.

The accompanying drawings illustrate an embodiment of the invention.

Figure 7:
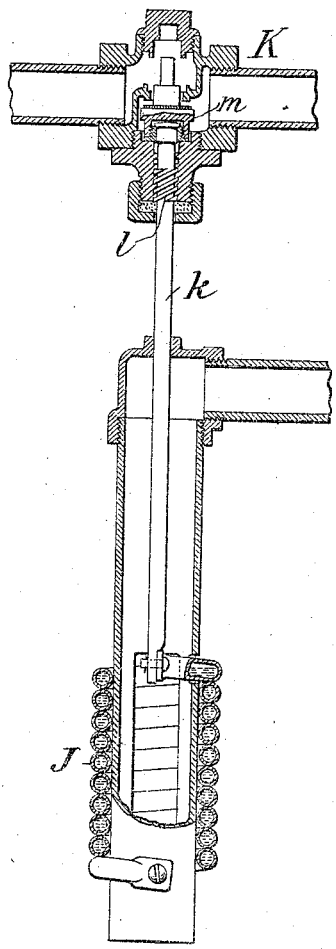
Figure 8:
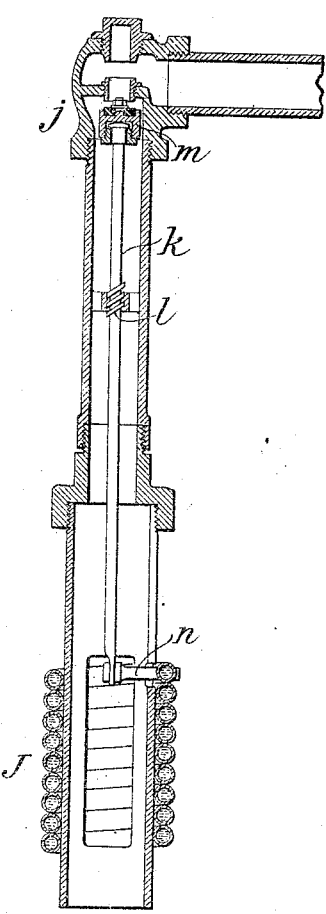
Figure 9:
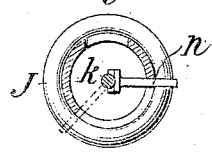

Figure 1 is a diagrammatic view of a heating system with thermostatic control of the admission valve, showing a simple mode of transmitting the expansive movement of the thermostat to the valve. Fig. 2 is a horizontal section of the lower part of the thermostat of Fig. 1. Fig. 3 is partly an elevation and partly a vertical section of the discharge end of the system with another style of transmission of the expansive movement applied to a discharge valve. Fig. 4 is a part of Fig. 3 in transverse vertical section. Fig. 5 is partly an elevation and partly a vertical section of another style of thermostatic coil. Fig. 6 is a perspective view of the lower part of an apparatus similar to Fig. 1, showing a simpler style of transmission. Figs. 7 and 8 are vertical sectional views, and Fig. 9 a horizontal section of another style.

The several thermostatic coils shown may be used in combination with any one of the motion-transmitting devices shown, and these may be applied either to the admission or to the discharge valve of the heating system or to control the heating medium in any other way.

Referring to the embodiments of the invention illustrated, Fig. 1 shows a car heating system including a train-pipe A running under each car and extending the length of the train, and taking a supply of steam under pressure from the locomotive boiler. From the train-pipe A branches B convey the steam to radiators at opposite sides of the car, only one radiator being shown. The branch B connects with a vertical pipe C passing through the floor of the car, the position of which is indicated in dotted lines at D, and thence by a pipe E to the radiator F, in the return pipe of which is an expansion loop G from which the steam or water of condensation passes to a vertical pipe H passing downward through the floor of the car and carrying a thermostatic coil J. Steam is admitted to the radiator through an automatic admission valve K and a hand valve L located within the car.

The coil J may be of the style shown in Figs. 2 and 3 comprising a tube filled with a liquid, highly expansible and preferably vaporizable at the high temperatures to which it is submitted; or it may be a bi-metallic coil J' as shown in Fig. 5 and made up of parallel strips or pipes M and N of metals having different co-efficients of expansion, such for example, as steel and brass, the inner metal being the more expansible so as to tend to uncoil as the temperature is raised.

Various means may be provided for transmitting the movements of the expansible coil to the valve. In the construction shown in Fig. 6 the coil, J, consisting of a number of convolutions, has its upper end fixed and its lower end free, and is directly connected at the lower end to a link O which in turn is connected to the end of the stem P of the automatic admission valve. In Fig. 1 there is shown a similar arrangement except for the substitution of a cam Z' for the link O of Fig. 6. Such an arrangement is used in vapor systems. When steam, or a mixture of steam and water of condensation of the determined temperature, is discharged through the coil, the latter is expanded and its free lower end turns sufficiently to force the automatic valve K shut so as to cut off the supply of steam. The atmosphere acting upon the outer surface of the coil then cools the latter and permits the valve to reopen. The number of convolutions of the coil is such as to give a sufficiently extended movement and to act with sufficient force upon the valve, the number of convolutions being dependent upon the material and design of the expansible element.

The construction of the thermostat is shown more in detail in Figs. 3 and 4. The coil is mounted upon the outside of a cylindrical pipe or support Q, having openings R through which the heat of the heating medium acts directly upon the inner surface of the coil, the support Q being screwed into a nipple S which is attached to the lower end of the vertical discharge pipe H of the system. Outward flanges or rings on the support Q hold the coil in place with slight freedom to permit the necessary uncoiling movement. For the devices of Figs. 3 and 4 a fixed ring T supports the lower end of the coil, the latter having a bend U entering a notch in the flange to prevent rotative movement; the upper end of the coil has a bend X fitting into a notch in a loose ring Y located upon the top of the coil and provided with a cam face Z. As the coil J is expanded or contracted its upper end rotates the cam Z to the right or to the left, and this cam transmits the desired movement to the valve. For protecting the coil against injury by stones or dirt, it is preferably surrounded by a thin jacket $a$ fastened to the lower flange T and perforated to permit free access of air to the outside of the coil. The movement of the cam Z may be transmitted to any desired valve or other controlling devices and in various ways. For example, as shown, the movement is transmitted to a rod or valve stem $b$ which is guided vertically within the discharge pipe H and carries the discharge valve proper $b'$ at its upper end. The rod $b$ carries at its lower end a cross-bar V projecting through the pipe Q and having on its ends rollers W which bear on the cam face Z. The cross-shaft V passes through slots $b^2$ in the discharge pipe, and these are covered by a slide $b^3$ to substantially prevent loss of steam.

Instead of using a cam of the style shown in Fig. 3, producing a vertical movement, a cam Z' (Figs. 1 and 2) may be used, the outer face of which is spiral and bears against the end of a motion-transmitting rod $h$ to produce the desired lateral motion; the cam Z' being mounted and connected similarly to the cam Z of Fig. 3 but at the lower end of the coil. Or two or more different motion-transmitting devices may be operated simultaneously from the expansible elements, such, for example, as a ring Y carrying both cams Z and Z'.

Another simple scheme for transmitting the coiling and uncoiling movement to the valve is shown in Fig. 7 in connection with an admission valve indicated as a whole by the letter K and in Fig. 8 in connection with a discharge valve indicated as a whole at $j$. The valve in each of these cases is mounted on a stem $k$ which screws through a fixed threaded nut $l$ suitably located, and of sufficiently high pitch, so that by a partial revolution of the stem $k$ the valve body $m$ is pressed against its seat, or is withdrawn from its seat a sufficient distance to give the desired clearance. The stem $k$ is substantially in the center of the coil and has an arm $m$, Fig. 9, connected to the free end of the coil, so that as said free end rotates said shaft is turned to secure the desired movement of the valve.

What I claim is:—

1. A heating system having a valve controlling the flow of the heating medium, a thermostatic coil having a movable end, means for transmitting the movement of said end to said valve, and means for directing the discharged heating medium upon the inside of said coil, the outside of said coil being exposed to the surrounding atmosphere.

2. A steam heating system for cars, having a valve controlling the flow of steam, a thermostatic coil located outside of the car and having a movable end, means for transmitting the movement of said end to said valve, and means for directing the discharge from the system against the inner surface of the coil, the outer surface of the coil being exposed to the surrounding atmosphere.

In witness whereof, I have hereunto signed my name in the presence of two subscribing witnesses.

EDWARD E. GOLD.

Witnesses:
HENRY M. TURK,
FRED WHITE.